US011276422B2

United States Patent
Le et al.

(10) Patent No.: US 11,276,422 B2
(45) Date of Patent: Mar. 15, 2022

(54) MAGNETIC RECORDING HEAD WITH NON-MAGNETIC CONDUCTIVE STRUCTURE

(71) Applicant: Western Digital Technologies, Inc., San Jose, CA (US)

(72) Inventors: Quang Le, San Jose, CA (US); Michael Kuok San Ho, Emerald Hills, CA (US); Suping Song, Fremont, CA (US); Goncalo Marcos Baião De Albuquerque, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/229,560

(22) Filed: Apr. 13, 2021

(65) Prior Publication Data
US 2021/0233559 A1 Jul. 29, 2021

Related U.S. Application Data

(62) Division of application No. 16/015,163, filed on Jun. 21, 2018, now Pat. No. 10,997,988.

(Continued)

(51) Int. Cl.
*G11B 5/127* (2006.01)
*G11B 5/31* (2006.01)
(Continued)

(52) U.S. Cl.
CPC .......... *G11B 5/1278* (2013.01); *G11B 5/3133* (2013.01); *G11B 5/3146* (2013.01); *G11B 5/3909* (2013.01); *G11B 2005/0024* (2013.01)

(58) Field of Classification Search
CPC ....... G11B 5/3109; G11B 5/35; G11B 5/3163; G11B 5/23; G11B 5/3146; G11B 5/1278; G11B 2005/0024
See application file for complete search history.

(56) References Cited

U.S. PATENT DOCUMENTS 8,472,135 B1 6/2013 Kusukawa et al.
8,582,240 B1 11/2013 Chen et al.
(Continued)

FOREIGN PATENT DOCUMENTS

CN 104835510 B 11/2017
JP 2013251042 A 12/2013
(Continued)

OTHER PUBLICATIONS

Mallary et al. "Head and Media Challenges for 3 Tb/in$^2$ Microwave-Assisted Magnetic Recording," IEEE Transactions on Magnetics, vol. 50, No. 7, Jul. 2014, 8 pages.

(Continued)

*Primary Examiner* — Brian E Miller
(74) *Attorney, Agent, or Firm* — Patterson & Sheridan, LLP; Steven H. Versteeg

(57) ABSTRACT

The present disclosure generally relates to data storage devices, and more specifically, to a magnetic media drive employing a magnetic recording head. The head includes a trailing shield, a main pole, an STO disposed between the trailing shield and the main pole, and a non-magnetic conductive structure (or non-magnetic conductive layers) adjacent to the main pole and in contact with the STO. The non-magnetic conductive structure provides additional paths for electrical currents to flow to the STO. The non-magnetic conductive structure enables higher current density to the STO without creating hot spots at the MFS. Maximum current efficiency and uniformity can be achieved with the non-magnetic conductive structure.

20 Claims, 15 Drawing Sheets

Related U.S. Application Data

(60) Provisional application No. 62/606,128, filed on Jun. 23, 2017.

(51) Int. Cl.
*G11B 5/39* (2006.01)
*G11B 5/00* (2006.01)

(56) References Cited

U.S. PATENT DOCUMENTS

| | | |
|---|---|---|
| 8,879,295 B1 | 11/2014 | Barth, Jr. et al. |
| 9,001,444 B1 | 4/2015 | Contreras et al. |
| 9,064,508 B1 | 6/2015 | Shiimoto et al. |
| 9,196,271 B1 | 11/2015 | Shirotori et al. |
| 9,230,571 B1 | 1/2016 | Chen et al. |
| 9,230,573 B1 | 1/2016 | Etoh et al. |
| 9,275,672 B2 | 3/2016 | Shiroishi et al. |
| 9,311,934 B1 | 4/2016 | Shiimoto et al. |
| 9,368,135 B2 | 6/2016 | Gao |
| 9,378,759 B2* | 6/2016 | Nagasaka ............... G11B 5/35 |
| 9,747,932 B1* | 8/2017 | Taguchi ................ G11B 5/235 |
| 9,881,637 B1 | 1/2018 | Wilson et al. |
| 9,899,042 B1 | 2/2018 | Venugopal et al. |
| 10,032,470 B1* | 7/2018 | Degawa ............. G11B 5/3133 |
| 10,121,497 B1 | 11/2018 | Takahashi et al. |
| 10,186,284 B2 | 1/2019 | Narita et al. |
| 10,236,021 B2 | 3/2019 | Narita et al. |
| 10,276,193 B2 | 4/2019 | Narita et al. |
| 10,325,618 B1 | 6/2019 | Wu et al. |
| 10,366,714 B1 | 7/2019 | Olson et al. |
| 10,446,178 B1 | 10/2019 | Tang et al. |
| 10,546,600 B1* | 1/2020 | Koizumi ................ G11B 5/012 |
| 10,580,441 B1* | 3/2020 | Chen .................... G11B 5/4833 |
| 10,714,126 B2* | 7/2020 | Matsumoto .......... G11B 5/1278 |
| 10,762,917 B1 | 9/2020 | Le et al. |
| 10,839,829 B1* | 11/2020 | Sasaki ................ G11B 5/3123 |
| 10,997,988 B1* | 5/2021 | Le ........................ G11B 5/3146 |
| 11,011,193 B1* | 5/2021 | Wu ....................... G11B 5/3146 |
| 11,049,513 B1* | 6/2021 | Le .......................... G11B 5/314 |
| 2008/0268291 A1 | 10/2008 | Akiyama et al. |
| 2008/0304176 A1 | 12/2008 | Takagishi et al. |
| 2009/0059423 A1 | 3/2009 | Yamada et al. |
| 2009/0310244 A1 | 12/2009 | Shimazawa et al. |
| 2011/0038080 A1 | 2/2011 | Alex et al. |
| 2011/0096443 A1* | 4/2011 | Zhang .................. G01R 33/098 |
| | | 360/324.2 |
| 2011/0279921 A1* | 11/2011 | Zhang .................. G11C 11/161 |
| | | 360/59 |
| 2011/0293967 A1* | 12/2011 | Zhang ..................... H01L 43/12 |
| | | 428/827 |
| 2012/0126905 A1* | 5/2012 | Zhang ................ G11C 11/1675 |
| | | 331/94.1 |
| 2013/0027803 A1 | 1/2013 | Tanabe et al. |
| 2013/0057983 A1 | 3/2013 | Tanabe et al. |
| 2013/0250456 A1 | 9/2013 | Yamada et al. |
| 2014/0139952 A1 | 5/2014 | Takeo et al. |
| 2014/0177100 A1 | 6/2014 | Sugiyama et al. |
| 2014/0313616 A1 | 10/2014 | Kusukawa et al. |
| 2015/0015992 A1 | 1/2015 | Funayama |
| 2015/0310881 A1 | 10/2015 | Koui |
| 2016/0027455 A1 | 1/2016 | Kudo et al. |
| 2017/0047084 A1 | 2/2017 | Funayama et al. |
| 2017/0061995 A1 | 3/2017 | Taguchi et al. |
| 2017/0148471 A1 | 5/2017 | Tabata et al. |
| 2017/0236537 A1 | 8/2017 | Murakami et al. |
| 2018/0268848 A1 | 9/2018 | Narita et al. |
| 2019/0088274 A1 | 3/2019 | Narita et al. |
| 2019/0088275 A1 | 3/2019 | Narita et al. |
| 2019/0251991 A1 | 8/2019 | Le et al. |
| 2019/0251992 A1* | 8/2019 | Ho ....................... G11B 5/7379 |
| 2019/0279663 A1* | 9/2019 | Song ..................... G11B 5/315 |
| 2020/0082845 A1 | 3/2020 | Suto et al. |
| 2020/0090685 A1 | 3/2020 | Takagishi et al. |
| 2021/0012794 A1* | 1/2021 | Tang ..................... G11B 5/315 |

FOREIGN PATENT DOCUMENTS

| | | |
|---|---|---|
| JP | 2018156709 A | 10/2018 |
| JP | 2019057338 A | 4/2019 |
| WO | 2015126326 A1 | 8/2015 |

OTHER PUBLICATIONS

Zhang et al. "State Diagram of Spin-Torque Oscillator with Perpendicular Reference Layer and Planar Field Seneration Layer," Science Direct, Progress in Natural Science: Materials International 25, 2015, pp. 258-262.

* cited by examiner

MAGNETIC RECORDING HEAD WITH NON-MAGNETIC CONDUCTIVE STRUCTURE

CROSS-REFERENCE TO RELATED APPLICATIONS

This application is a divisional of co-pending U.S. patent application Ser. No. 16/015,163, filed Jun. 21, 2018, which application claims priority to U.S. Provisional Patent Application Ser. No. 62/606,128, filed on Jun. 23, 2017, each of which herein is incorporated by reference.

BACKGROUND

Field of the Disclosure

Embodiments of the present disclosure generally relate to data storage devices, and more specifically, to a magnetic media drive employing a magnetic recording head.

Description of the Related Art

Over the past few years, microwave assisted magnetic recording (MAMR) has been studied as a recording method to improve the areal density of a magnetic read/write device, such as a hard disk drive (HDD). MAMR enabled magnetic recording heads utilize a spin torque oscillator (STO) for generating a microwave (high frequency AC magnetic field). When the magnetic field from the write head is applied and current is conducted to the STO from the main pole, the STO oscillates and may provide an AC magnetic field to the recording medium. The AC magnetic field may reduce the coercive force of the recording medium, thus high quality recording by MAMR may be achieved. Typically the STO includes a spin polarization layer (SPL), a field generation layer (FGL) and an interlayer disposed between the SPL and the FGL. The STO generates high frequency magnetic fields, or microwaves, as a result of the transfer of spin torque from the SPL through the interlayer to the FGL, and the in-plane high speed rotation of the magnetization of the FGL serves as the in-plane free layer.

However, current efficiency from the main pole to the STO is low due to current crowding. Furthermore, hot spots can form at a media facing surface (MFS) when higher current density is driven to the STO, reducing the reliability of the data storage device. Therefore, there is a need in the art for an improved data storage device.

SUMMARY OF THE DISCLOSURE

The present disclosure generally relates to data storage devices, and more specifically, to a magnetic media drive employing a magnetic recording head. The head includes a trailing shield, a main pole, an STO disposed between the trailing shield and the main pole, and a non-magnetic conductive structure (or non-magnetic conductive layers) adjacent to the main pole and in contact with the STO. The non-magnetic conductive structure provides additional paths for electrical currents to flow to the STO. The non-magnetic conductive structure enables higher current density to the STO without creating hot spots at the MFS. Maximum current efficiency and uniformity can be achieved with the non-magnetic conductive structure.

In one embodiment, a magnetic recording head includes a main pole, a spin torque oscillator in contact with the main pole, and a non-magnetic conductive structure surrounding at least a portion of the main pole, wherein the non-magnetic conductive structure is in contact with the spin torque oscillator.

In another embodiment, a magnetic recording head includes a main pole, a spin torque oscillator in contact with the main pole, and a non-magnetic conductive structure in contact with the main pole at a media facing surface.

In another embodiment, a magnetic recording head includes a main pole, wherein the main pole includes a first surface at a media facing surface, a second surface adjacent to the first surface, a third surface connected to the second surface, and a fourth surface opposite the third surface, a spin torque oscillator in contact with the second surface of the main pole, a first non-magnetic conductive layer in contact with the spin torque oscillator, and a second non-magnetic conductive layer in contact with the spin torque oscillator.

In another embodiment, a magnetic recording head includes a main pole, a spin torque oscillator in contact with the main pole, and means for providing paths for electrical currents to flow to the spin torque oscillator, wherein the means for providing paths for electrical currents to flow to the spin torque oscillator surrounds a portion of the main pole at a media facing surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a trailing shield, a main pole, an STO disposed between the trailing shield and the main pole, and a non-magnetic conductive structure (or non-magnetic conductive layers) adjacent to the main pole and in contact with the STO. The non-magnetic conductive structure provides additional paths for electrical currents to flow to the STO. The non-magnetic conductive structure enables higher current density to the STO without creating hot spots at the MFS. Maximum current efficiency and uniformity can be achieved with the non-magnetic conductive structure.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
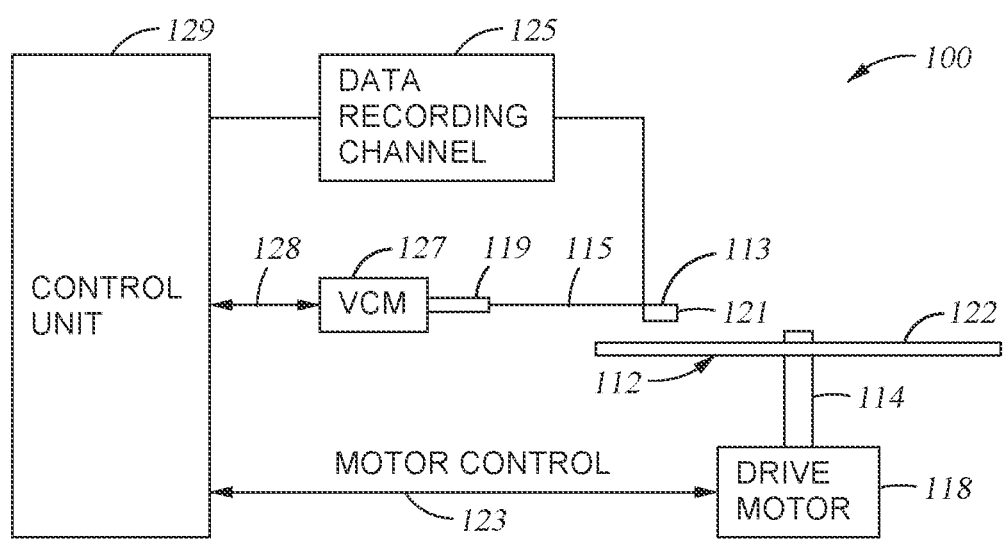
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include an STO for applying an AC magnetic field to a disk surface 122 and one or more non-magnetic conductive layers in contact with the STO. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128.

The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
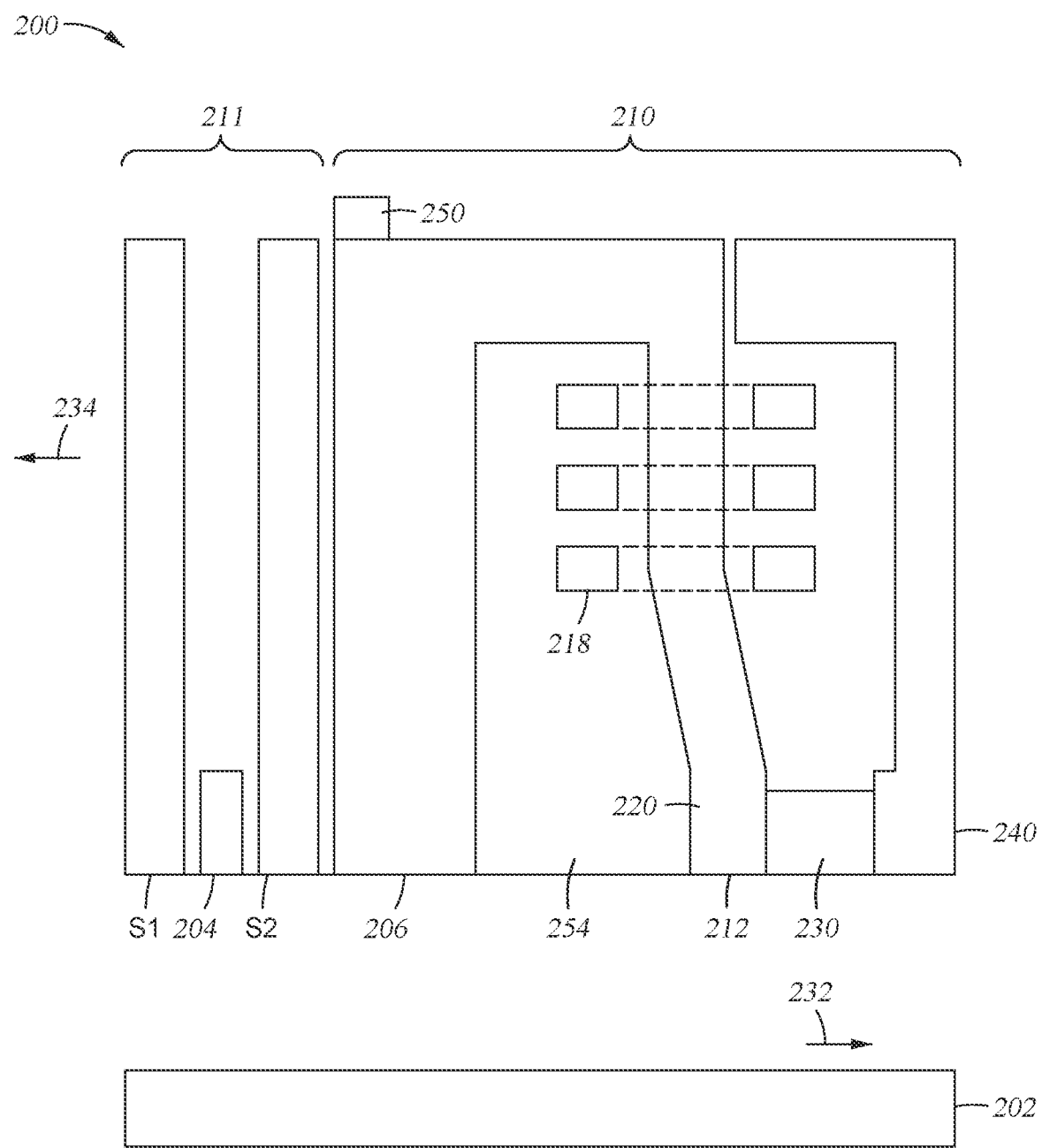
FIG. 2 is a fragmented, cross sectional side view of a MAMR read/write head facing a magnetic disk according to one embodiment.
Figure 2:
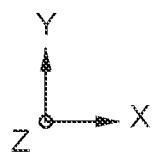

FIG. 2 is a fragmented, cross sectional side view of a MAMR read/write head 200 facing the magnetic disk 202 according to one embodiment. The MAMR read/write head 200 and the magnetic disk 202 may correspond to the magnetic head assembly 121 and the magnetic disk 112, respectively in FIG. 1. The read/write head 200 includes a MFS 212, such as an air bearing surface (ABS), facing the disk 202, a magnetic write head 210, and a magnetic read head 211. As shown in FIG. 2, the magnetic disk 202 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, an STO 230 disposed between the main pole 220 and the trailing shield 240, and a coil 218 that excites the main pole 220. The coil 218 may have a "pancake" structure which winds around a back-contact between the main pole 220 and the trailing shield 240, instead of a "helical" structure shown in FIG. 2. A dielectric material 254, such as alumina, is located between the leading shield 206 and the main pole 220. The main pole 220 may be a magnetic material such as a FeCo alloy. The leading shield 206 and the trailing shield 240 may be a magnetic material, such as NiFe alloy.

The main pole 220, the trailing shield 240 and the STO 230 all extend to the MFS 212, and the STO 230 disposed between the main pole 220 and the trailing shield 240 is electrically coupled to the main pole 220 and the trailing shield 240. During operation, the STO 230 generates an AC magnetic field that travels to the magnetic disk 202 to lower the coercivity of the region of the magnetic disk 202 adjacent to the STO 230. The write head 210 further includes a heater 250 for adjusting the distance between the read/write head 200 and the magnetic disk 202. The location of the heater 250 is not limited to above the leading shield 206, as shown in FIG. 2. The heater 250 may be disposed at any suitable location.

Figure 3A:
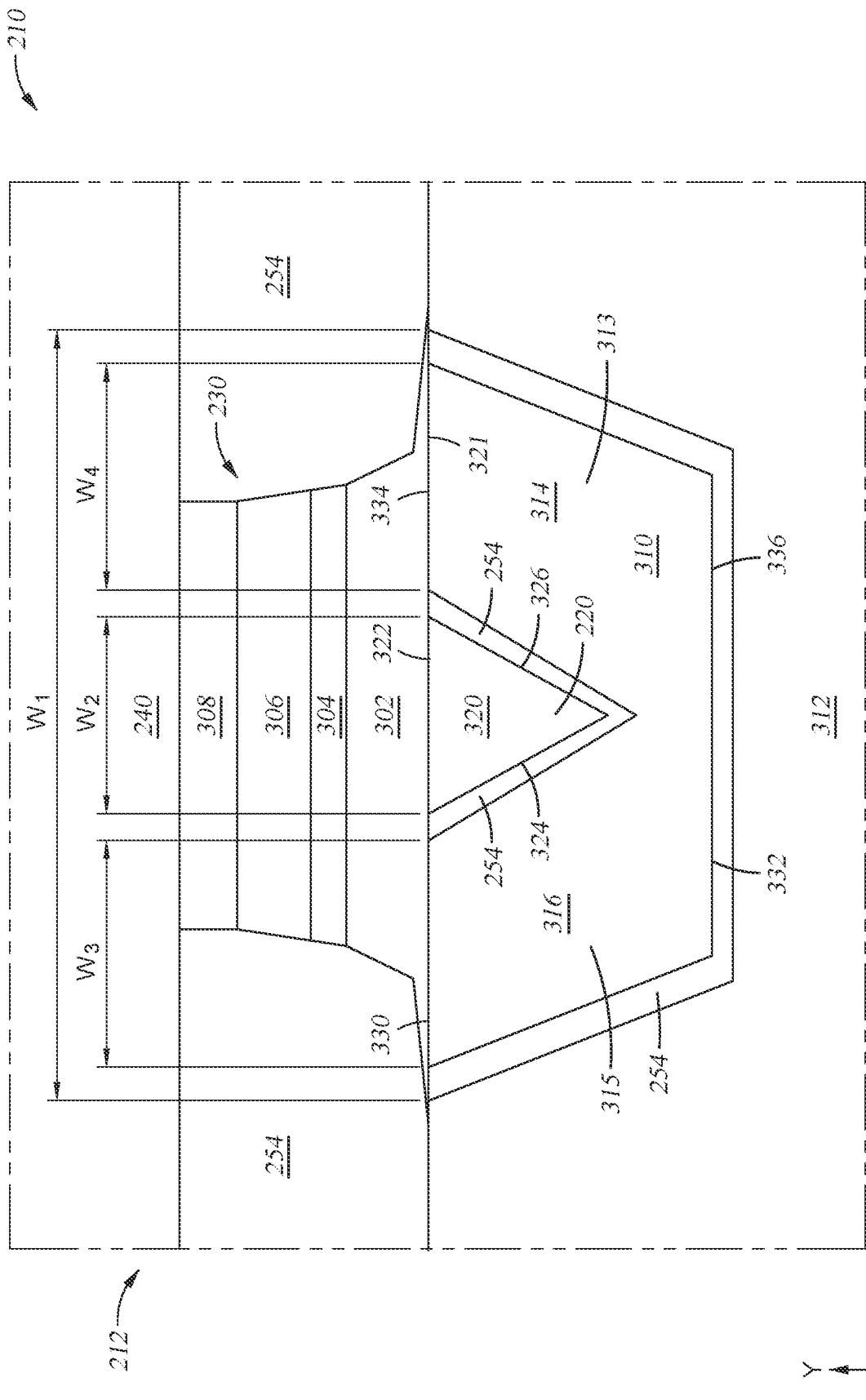
FIG. 3A is a MFS view of a portion of a write head of FIG. 2 according to one embodiment.

FIG. 3A is a MFS view of a portion of a write head 210 of FIG. 2 according to one embodiment. As shown in FIG. 3A, The write head 210 includes the trailing shield 240, the main pole 220, the STO 230 disposed between the trailing shield 240 and the main pole 220, a non-magnetic conductive structure 310 surrounding a portion of the main pole 220, and a side shield 312 surrounding the non-magnetic conductive structure 310. The definition of the term "surround" includes having an intermediate material between a first element that is surrounding a second element and the second element that is being surrounded by the first element. For example, the dielectric material 254 is disposed between the non-magnetic conductive structure 310 and the main pole 220. The dielectric material 254 is also disposed between the side shield 312 and the non-magnetic conductive structure 310. The STO 230 includes a first magnetic layer 302, a second magnetic layer 306, an interlayer 304 disposed between the first magnetic layer 302 and the second magnetic layer 306, and a cap layer 308. In one embodiment, the first magnetic layer 302 is the SPL and the second magnetic layer 306 is the FGL. The SPL is located proximate to the main pole 220, and the FGL is located proximate to the trailing shield 240. In another embodiment, the first magnetic layer 302 is the FGL and the second magnetic layer 306 is the SPL. The SPL is located proximate to the trailing shield 240, and the FGL is located proximate to the main pole 220. The SPL may be a CoNi layer having perpendicular magnetic anisotropy. Other materials may be used as the SPL, such as CoPt, CoCrPt, CoPd, FePt, CoFePd, TbFeCo, CoMnGe, or combinations thereof. The FGL may be a CoFe layer or Co and Fe laminations. The interlayer 304 may be a metal layer having long spin diffusion length such as Au, Ag, Cu, or alloys such as AgSn, when the STO 230 employs current perpendicular to plane (CPP) giant magnetoresistance (GMR). The cap layer 308 is an electrical conductive layer, such as a Ru/Ta/Ru multi-layer stack. The STO 230 may include different layers or different configuration of layers.

The main pole 220 includes a first surface 320 at the MFS 212, a second surface 322 adjacent to the first surface 320, a third surface 324 connected to the second surface 322, and a fourth surface 326 opposite the third surface 324. The second surface 322 is in contact with a surface 321 of the STO 230. The surface 321 is part of the first magnetic layer 302, as shown in FIG. 3A. In some embodiments, the STO 230 may include an underlayer disposed between the second surface 322 of the main pole 220 and the first magnetic layer 302. When an underlayer is present, the surface 321 is part of the underlayer. The second surface 322 has a width $W_2$ at the MFS 212 in the cross-track direction, as indicated by the X-axis. The surface 321 of the STO 230 has a width $W_1$ at the MFS 212 in the cross-track direction, as indicated by the X-axis. The width $W_1$ of the surface 321 of the STO 230 at the MFS 212 is substantially greater than the width $W_2$ of the second surface 322 of the main pole 220 at the MFS 212.

Conventionally, the STO 230 is in contact with a dielectric material that surrounds the main pole 220, so the electrical current flowing to the STO 230 is from the main pole 220 only, which creating a current crowding issue. Furthermore, as higher current density is driven to the STO 230 from the main pole 220, hot spots can form at the MFS 212. In order to spread the electrical current and to increase current uniformity and efficiency, the non-magnetic conductive structure 310 is utilized.

The non-magnetic conductive structure 310 is fabricated from a non-magnetic electrically conductive metal, such as NiTa, Cr, Cu, Ag, Au, or Rh. In some embodiments, the non-magnetic conductive structure 310 is fabricated from a multi-layer stack, such as NiTa/Ru, Cr/Cu, or Cr/Rh. The non-magnetic conductive structure 310 surrounds a portion of the main pole 220 at the MFS 212. For example, the non-magnetic conductive structure 310 surrounds the third surface 324 and the fourth surface 326 of the main pole 220. In one embodiment, the non-magnetic conductive structure 310 includes a first portion 314 and a second portion 316, and the first portion 314 and the second portion 316 are fabricated from the same non-magnetic conductive material.

The first portion 314 of the non-magnetic conductive structure 310 faces the fourth surface 326 of the main pole 220. The definition of the term "face" is extended to include a material located between a first element that is facing a second element and the second element. For example, the dielectric material 254 is located between the first portion 314 of the non-magnetic conductive structure 310 and the fourth surface 326 of the main pole 220. The second portion 316 faces the third surface 324 of the main pole 220. The first portion 314 includes a first surface 334 in contact with the surface 321 of the STO 230, a second surface 336 opposite the first surface 330, and a third surface 313 at the MFS 212 connecting the first surface 334 and the second surface 336. The second portion 316 includes a first surface 330 in contact with the surface 321 of the STO 230, a second surface 332 opposite the first surface 330, and a third surface 315 at the MFS 212 connecting the first surface 330 and the second surface 332. The first surface 334 of the first portion 314, the first surface 330 of the second portion 316, and the second surface 322 of the main pole 220 are co-planar. The second surface 336 of the first portion 314 and the second surface 332 of the second portion 316 are co-planar. The first surface 334 of the first portion 314 has a width $W_4$ at the MFS 212, and the first surface 330 of the second portion 316 has a width $W_3$ at the MFS 212. In one embodiment, the width $W_3$ is substantially the same as the width $W_4$. In one embodiment, the width $W_3$ is substantially different from the width $W_4$. The widths $W_3$, $W_4$ may be substantially greater than the width $W_2$ of the surface 322 of the main pole 220. The widths $W_1$, $W_2$, $W_3$, $W_4$ are in the cross-track direction, as indicated by the X-axis. In one embodiment, the non-magnetic conductive structure 310 is separated from the main pole 220 by the dielectric material 254. In one embodiment, the dielectric material 254 between the non-magnetic conductive structure 310 and the main pole is replaced with a non-magnetic electrically resistive material. The non-magnetic conductive structure 310 is separated from the side shield 312 by the dielectric material 254.

One or multiple current sources may be used to provide a current flowing to the STO 230 from the main pole 220 and a current flowing to the STO 230 from the non-magnetic conductive structure 310. When multiple current sources are used, the current uniformity can be further controlled by controlling the multiple current sources. The non-magnetic conductive structure 310 provides additional paths for electrical currents to flow to the STO 230. The non-magnetic conductive structure 310 enables higher current density to the STO 230 without creating hot spots at the MFS 212. Maximum current efficiency and uniformity can be achieved with the non-magnetic conductive structure 310. In one embodiment, two current sources are utilized. The first current source is connected to the main pole 220, and the second current source is connected to the non-magnetic conductive structure 310 to provide independent flow control to the main pole 220 and the non-magnetic conductive structure 310. In one embodiment, one current source is connected to the main pole 220 and the non-magnetic conductive structure 310, and the non-magnetic electrically resistive material is disposed between the main pole 220 and the non-magnetic conductive structure 310 instead of the dielectric material 254. With the non-magnetic electrically resistive material separating the main pole 220 and the non-magnetic conductive structure 310, a differential current can flow through each of the main pole 220 and the non-magnetic conductive structure 310 with one current source to achieve maximum current uniformity and efficiency. Various current flow patterns using the one or more current sources are illustrated in FIGS. 5A-5D.

Figure 3B:
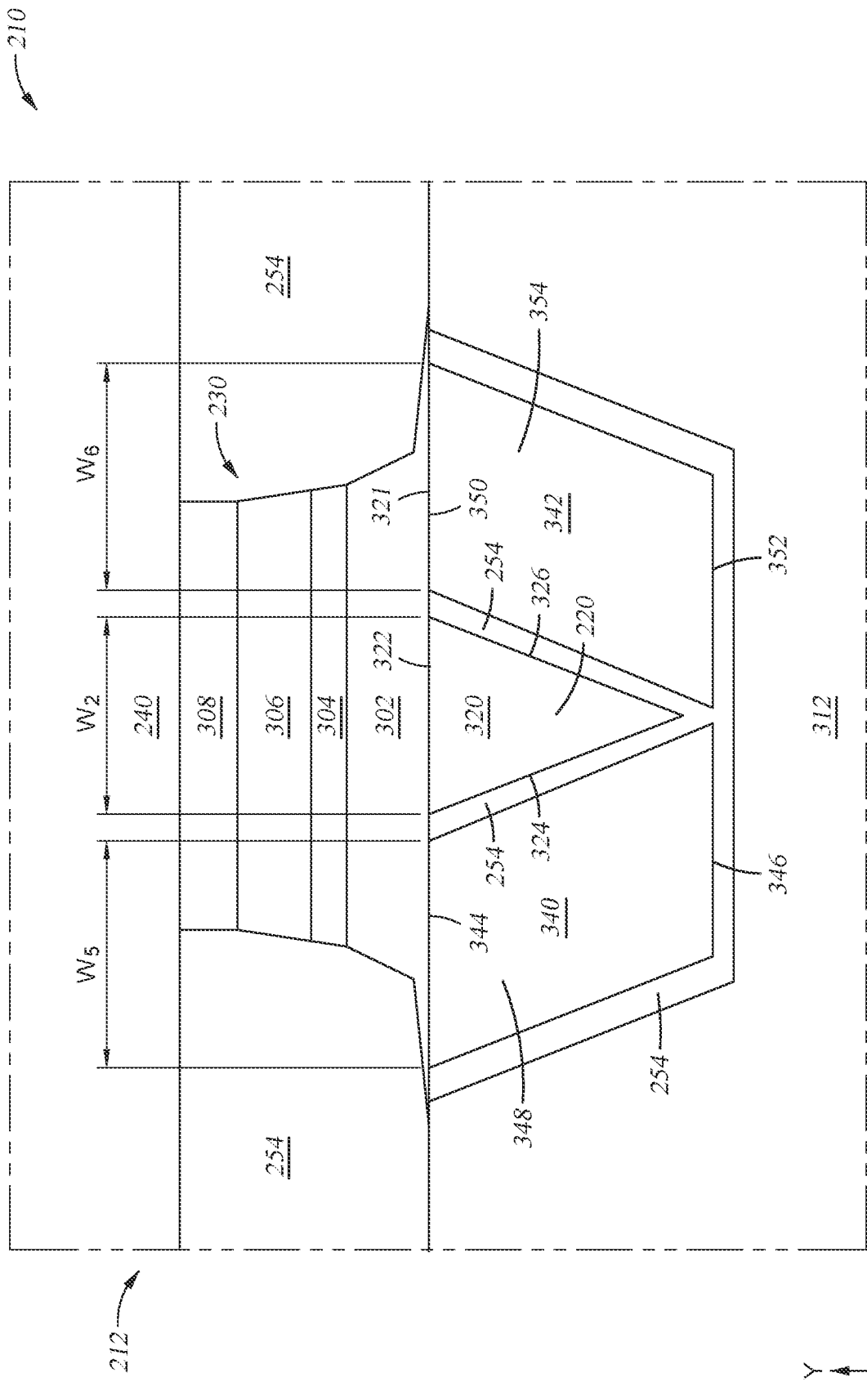
FIG. 3B is a MFS view of a portion of a write head of FIG. 2 according to another embodiment.

In one embodiment, the non-magnetic conductive structure 310 includes a single piece of material, as shown in FIG. 3A. In other embodiments, there may be separate non-magnetic conductive layers. FIG. 3B is a MFS view of a portion of the write head 210 of FIG. 2 according to one embodiment. The write head 210 shown in FIG. 3B is similar to the write head 210 shown in FIG. 3A, except that the non-magnetic conductive structure 310 is replaced with a first non-magnetic conductive layer 340 and a second non-magnetic conductive layer 342. As shown in FIG. 3B, the write head 210 includes the trailing shield 240, the STO 230, the main pole 220, the first non-magnetic conductive layer 340, the second non-magnetic conductive layer 342, the dielectric material 254, and the side shield 312. The first non-magnetic conductive layer 340 is separated from the second non-magnetic conductive layer 342 by the dielectric material 254. The first non-magnetic conductive layer 340 and the second non-magnetic conductive layer 342 are fabricated from the same non-magnetic conductive materials. In one embodiment, the first non-magnetic conductive layer 340 and the second non-magnetic conductive layer 342 are fabricated from the same material as the non-magnetic conductive structure 310.

The first non-magnetic conductive layer 340 is separated from the main pole 220, the side shield 312, and the second non-magnetic conductive layer 342 by the dielectric material 254. The second non-magnetic conductive layer 342 is separated from the main pole 220, the side shield 312, and the first non-magnetic conductive layer 340 by the dielectric material 254. The first non-magnetic conductive layer 340 includes a first surface 344 in contact with the surface 321 of the STO 230, a second surface 346 opposite the first surface 344, and a third surface 348 at the MFS 212 connecting the first surface 344 and the second surface 346. The second non-magnetic conductive layer 342 includes a first surface 350 in contact with the surface 321 of the STO 230, a second surface 352 opposite the first surface 350, and a third surface 354 at the MFS 212 connecting the first surface 350 and the second surface 352. The first surface 344 of the first non-magnetic conductive layer 340, the first surface 350 of the second non-magnetic conductive layer 342, and the second surface 322 of the main pole 220 are co-planar. The second surface 346 of the first non-magnetic conductive layer 340 and the second surface 352 of the second non-magnetic conductive layer 342 are co-planar. The first surface 344 of the first non-magnetic conductive layer 340 has a width $W_5$ at the MFS 212, and the first surface 350 of the second non-magnetic conductive layer 342 has a width $W_6$ at the MFS 212. In one embodiment, the width $W_5$ is substantially the same as the width $W_6$. In one embodiment, the width $W_5$ is substantially different from the width $W_6$. The widths $W_5$, $W_6$ may be substantially greater than the width $W_2$ of the surface 322 of the main pole 220. The widths $W_5$, $W_6$ are in the cross-track direction, as indicated by the X-axis. In some embodiments, one or both non-magnetic conductive layers 340, 342 are connected to a resistor 370 (FIG. 3D) to provide a differential current through the non-magnetic conductive layers 340, 342. In one embodiment, three current sources are utilized. The first current source is connected to the main pole 220, the second current source is connected to the first non-magnetic conductive layer 340, and the third current source is connected to the second non-magnetic conductive layer 342 to provide independent flow control to the main pole 220, the first non-magnetic conductive layer 340, and the second non-magnetic conductive layer 342. When multiple current sources are used, the current uniformity can be further controlled by controlling the multiple current sources.

Figure 3C:
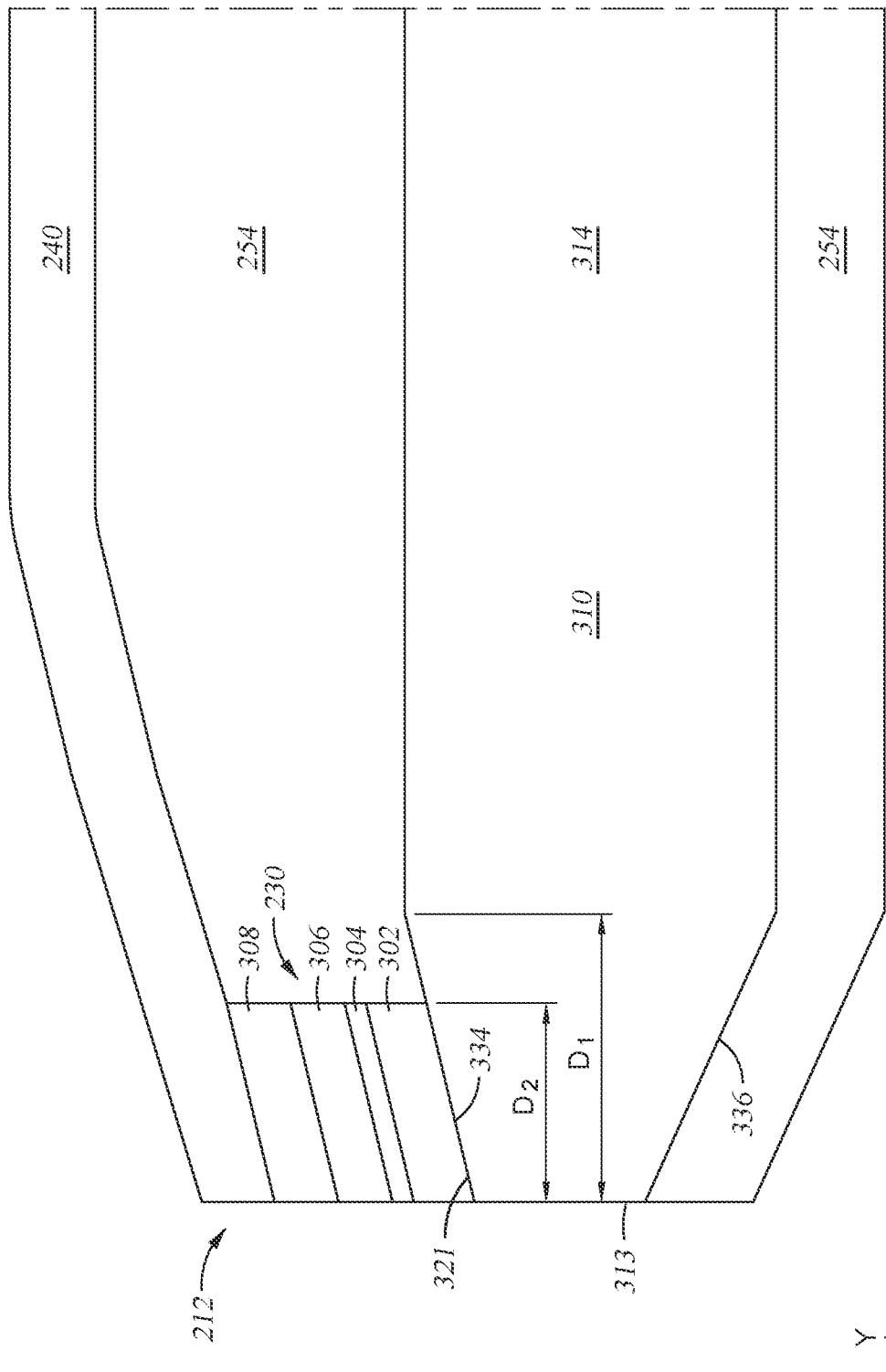
FIGS. 3C-3D are cross sectional side views of a portion of a write head of FIG. 2 according to embodiments.
Figure 3D:
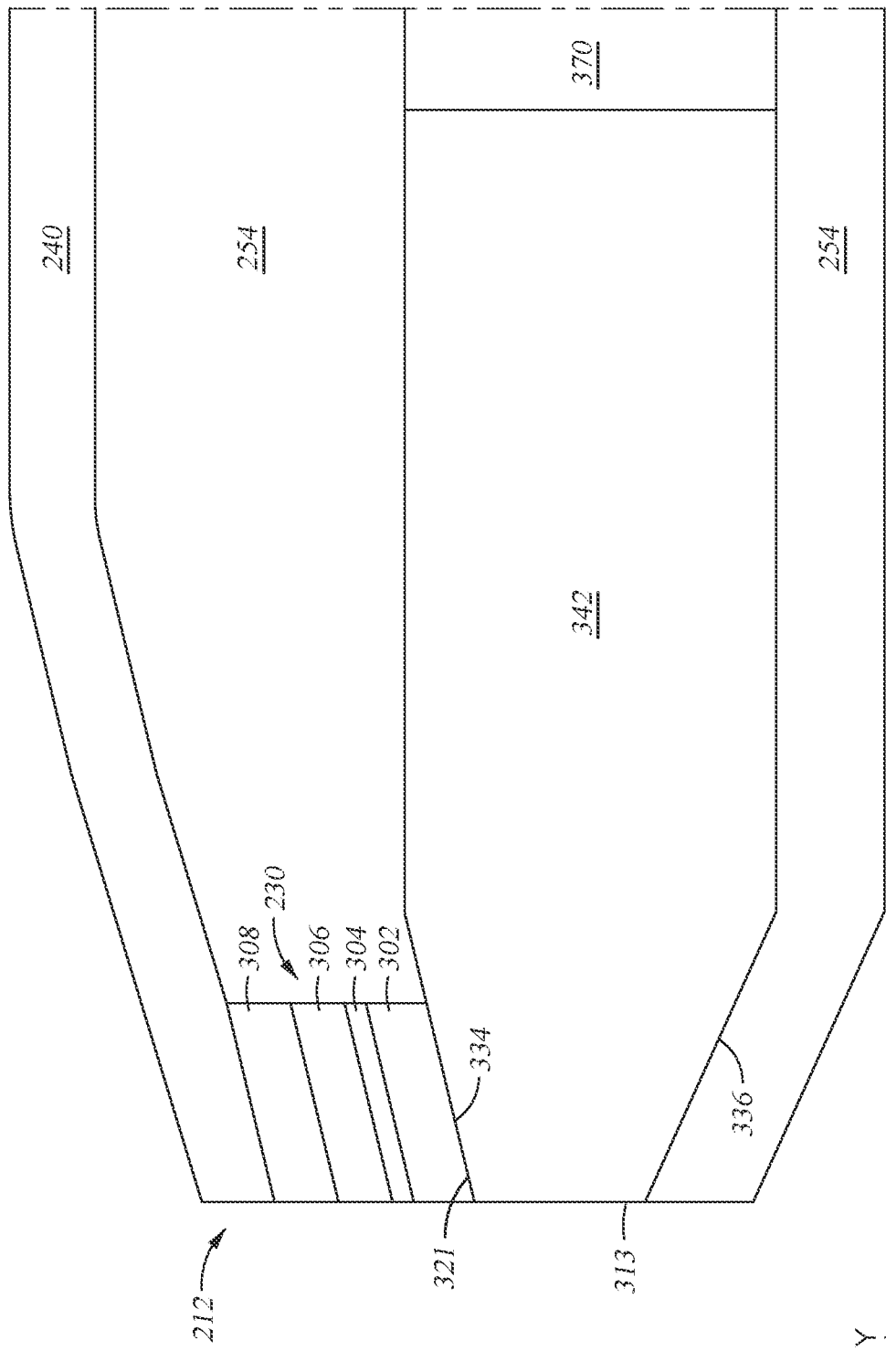

FIGS. 3C-3D are cross sectional side views of a portion of the write head 210 of FIG. 2 according to embodiments. As shown in FIG. 3C, the write head 210 includes the trailing shield 240, the STO 230, the non-magnetic conductive structure 310, and the dielectric material 254. The non-magnetic conductive structure 310 includes the first portion 314 having the first surface 334 in contact with the surface 321 of the STO 230, the second surface 336 opposite the first surface 334, and the third surface 313 at the MFS 212. As shown in FIG. 3C, the first surface 334 extends obliquely from the MFS 212 to a first location within the write head 210, and the second surface 336 extends obliquely from the MFS 212 to a second location within the write head 210. The first location is a distance $D_1$ from the MFS 212. The surface 321 of the STO 230 extends obliquely from the MFS 212 to a third location within the write head 210. The third location is a distance $D_2$ away from the MFS 212. The distance $D_1$ is substantially greater than the distance $D_2$. The first surface 334 is co-planar with the second surface 322 of the main pole 220 (FIG. 3A).

FIG. 3D is a cross sectional side view of the portion of the write head 210 shown in FIG. 3B according to embodiments. As described in FIG. 3B, in one embodiment, three current sources are utilized. The first current source is connected to the main pole 220, the second current source is connected to the first non-magnetic conductive layer 340, and the third current source is connected to the second non-magnetic conductive layer 342 to provide independent flow control to the main pole 220, the first non-magnetic conductive layer 340, and the second non-magnetic conductive layer 342. In some embodiments, two current sources are utilized, and the first and second non-magnetic conductive layers 340, 342 share a current source. In order to provide a differential current flowing through the first and second non-magnetic conductive layers 340, 342, one or more resistors 370 are utilized. The one or more resistors 370 are fabricated from the same material as the non-magnetic resistive material described in FIG. 3A. In one embodiment, as shown in FIG. 3D, one resistor 370 is in contact with one of the first and second non-magnetic conductive layer 340, 342, such as the second non-magnetic conductive layer 342, while the other of the first and second non-magnetic conductive layer 340, 342, such as the first non-magnetic conductive layer 340 (FIG. 3B), is not in contact with a resistor. In one embodiment, the first and second non-magnetic conductive layers 340, 342 each are in contact with a resistor 370. With the one or more resistors 370, a differential current can flow through each of the first and second non-magnetic conductive layers 340, 342 with one current source to achieve maximum current uniformity and efficiency.

In one embodiment, the one or more resistors 370 are recessed from the MFS 212, as shown in FIG. 3D. The one or more resistors 370 are located within the write head 210, as shown in FIG. 3D, or outside of the write head 210. The one or more resistors 370 are located along one or more electrical connections between a single current source and non-magnetic conductive layers 340, 342. The resistor 370 is not in contact with the main pole 220.

Figure 4A:
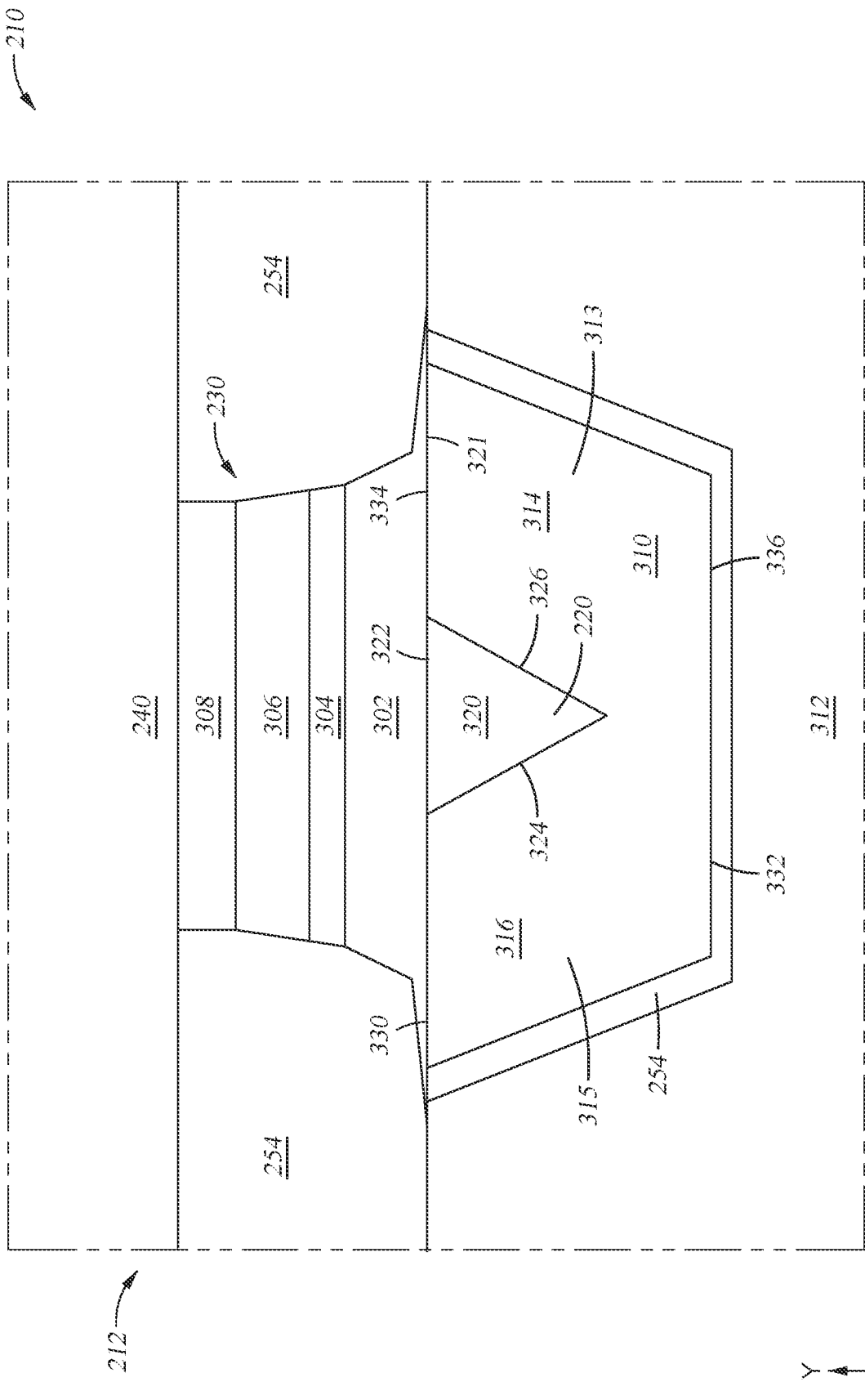
FIGS. 4A-4B are MFS views of a portion of a write head of FIG. 2 according to embodiments.

FIG. 4A is a MFS view of a portion of the write head 210 of FIG. 2 according to one embodiment. The write head 210 shown in FIG. 4A is similar to the write head 210 shown in FIG. 3A, except that the non-magnetic conductive structure 310 is in contact with the main pole 220. As shown in FIG.

Figure 6A:
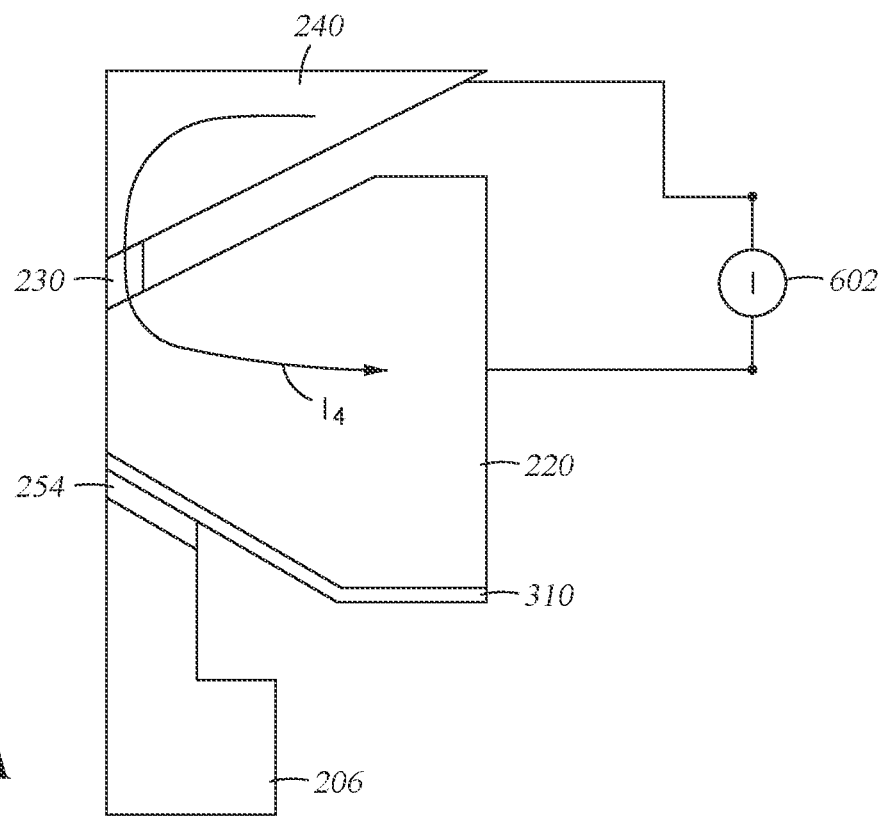
FIGS. 6A-6C are cross sectional side views of the write head of FIG. 4A according to embodiments.
Figure 6B:
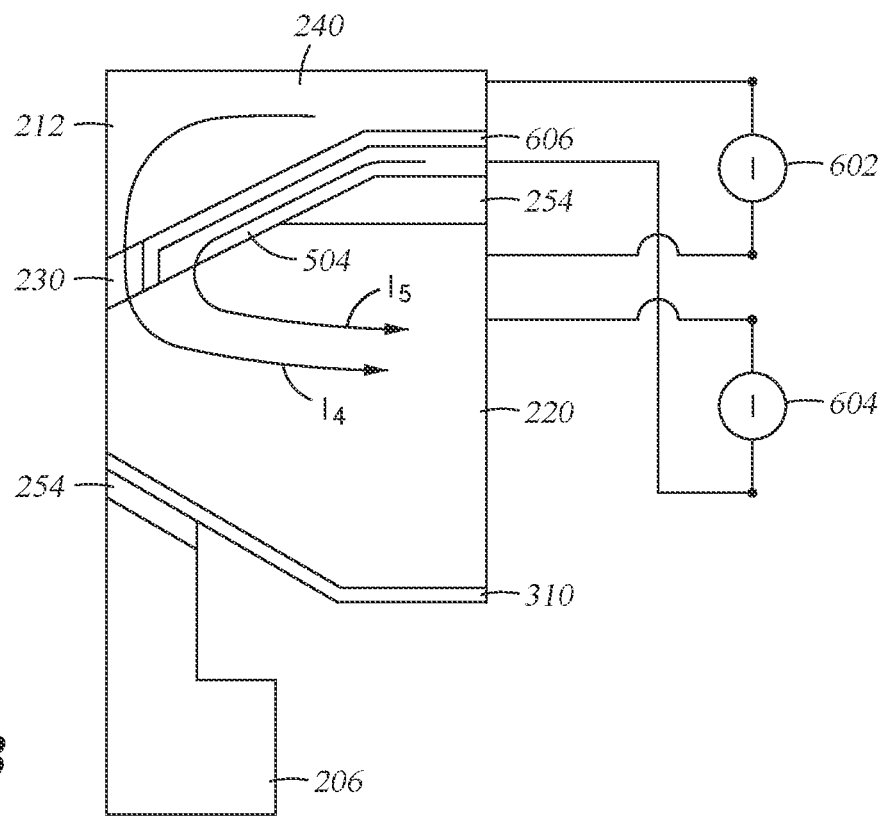
Figure 6C:
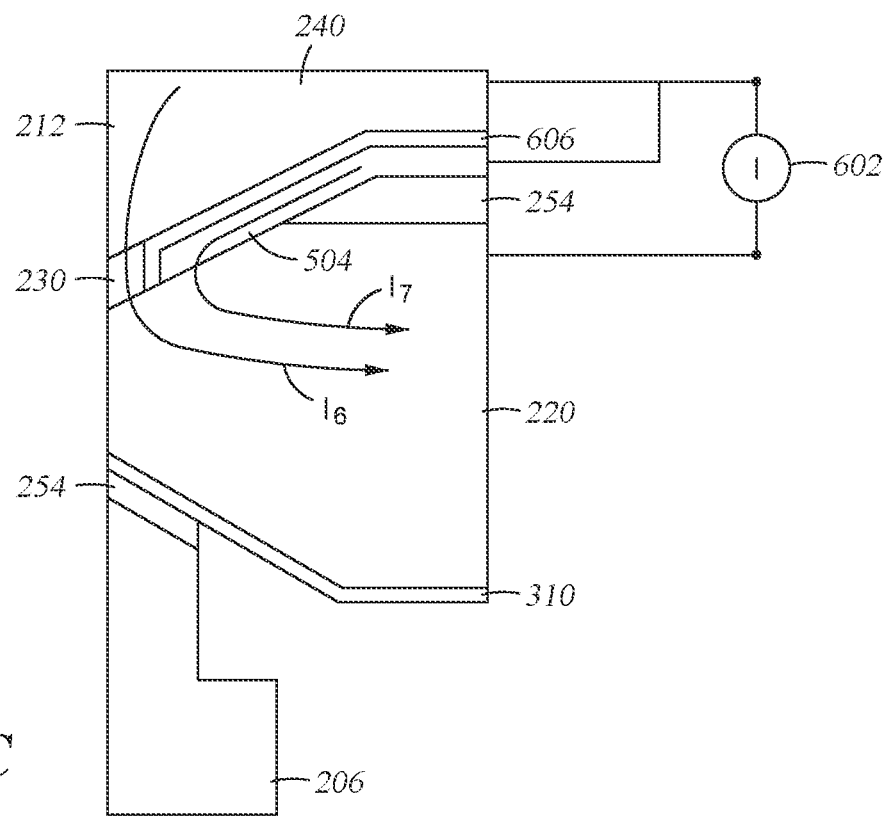

4A, the write head 210 includes the trailing shield 240, the STO 230, the main pole 220, the non-magnetic conductive structure 310, the dielectric material 254, and the side shield 312. The non-magnetic conductive structure 310 is separated from the side shield 312 by the dielectric material 254. However, the dielectric material 254 is not between the non-magnetic conductive structure 310 and the main pole 220. The first portion 314 of the non-magnetic conductive structure 310 is in contact with the fourth surface 326 of the main pole 220. The second portion 316 of the non-magnetic conductive structure 310 is in contact with the third surface 324 of the main pole 220. Because the non-magnetic conductive structure 310 is in contact with the main pole 220, the current flowing to the STO 230 from the main pole 220 and the non-magnetic conductive structure 310 is more uniform. In one embodiment, the main pole 220 and the non-magnetic conductive structure 310 are connected to the same current source. Various current flow patterns using one or more current sources and the write head 210 shown in FIG. 4A are illustrated in FIGS. 6A-6C.

Figure 4B:
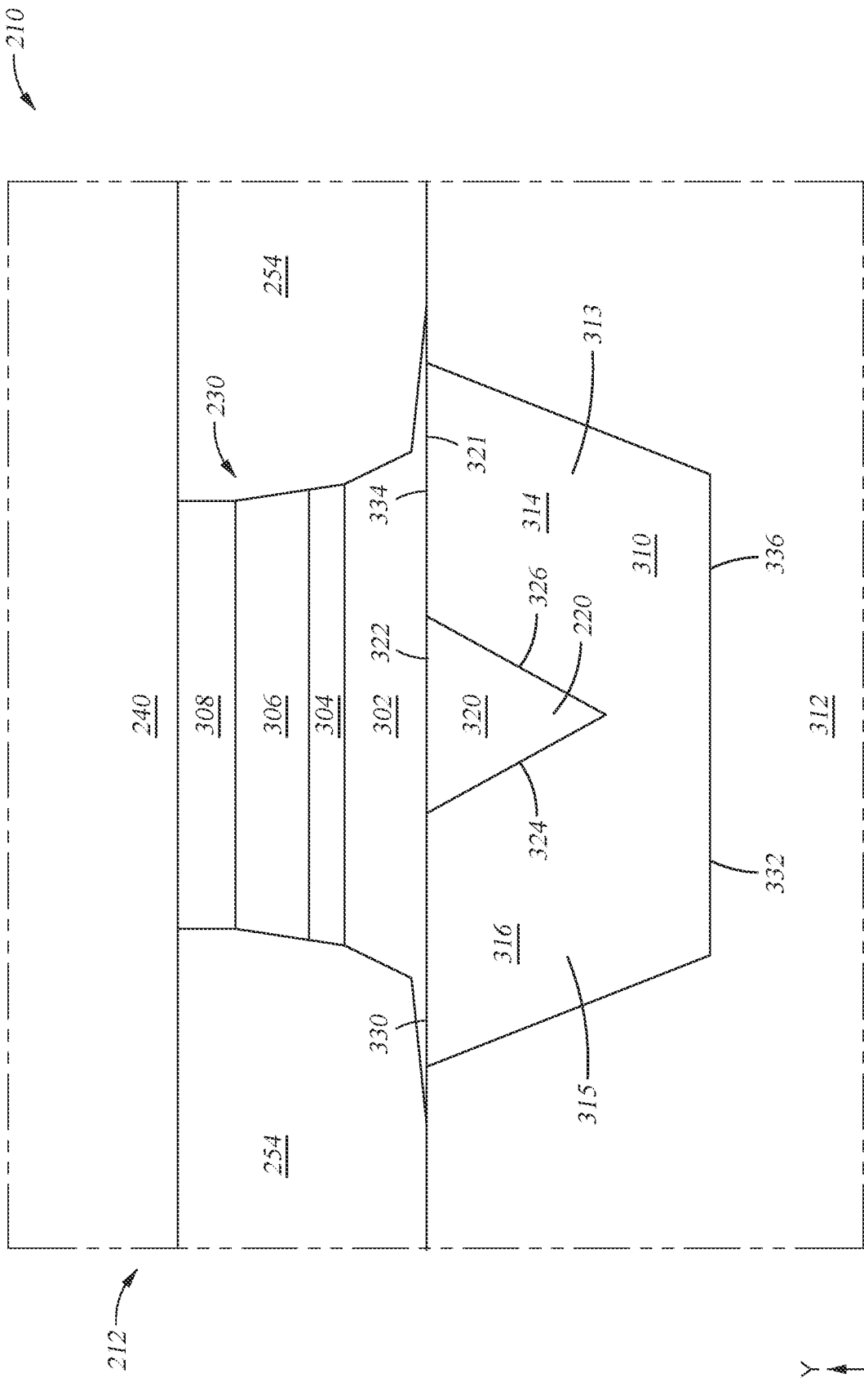

FIG. 4B is a MFS view of a portion of the write head 210 of FIG. 2 according to another embodiment. The write head 210 shown in FIG. 4B is similar to the write head 210 shown in FIG. 4A, except that the dielectric material 254 between the non-magnetic conductive structure 310 and the side shield 312 is not present, and the non-magnetic conductive structure 310 is in contact with the side shield 312. Various current flow patterns using one or more current sources and the write head 210 shown in FIG. 4B are illustrated in FIGS. 7A-7F.

Figure 5A:
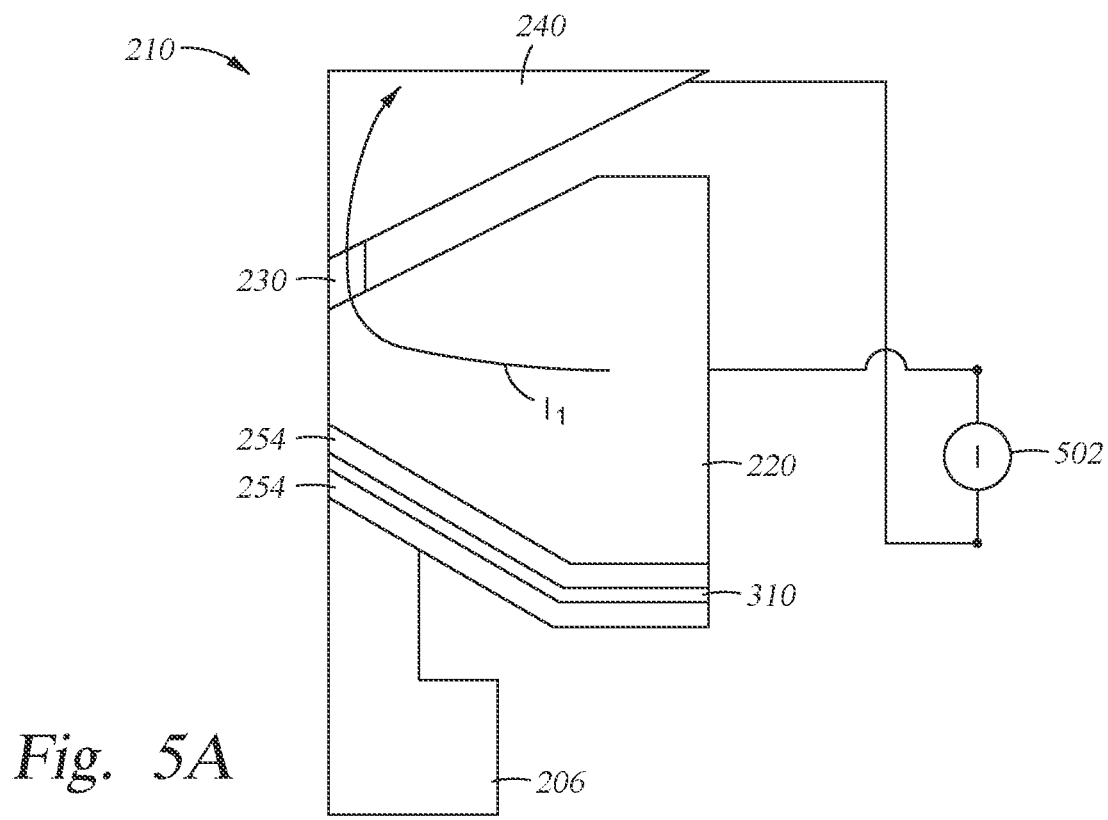
FIGS. 5A-5D are cross sectional side views of the write head of FIG. 3A according to embodiments.

FIGS. 5A-5D are cross sectional side views of the write head 210 of FIG. 3A according to one embodiment. The dielectric material 254 between the trailing shield 240 and the main pole 220 is omitted in FIGS. 5A-5B for better illustration. As shown in FIG. 5A, the write head 210 includes a current source 502 connected to the main pole 220 and the trailing shield 240. A current $I_1$ generated from the current source 502 flows from the main pole 220 to the trailing shield 240 through the STO 230. In one embodiment, the current $I_1$ flows from the trailing shield 240 to the main pole 220 through the STO 230. The write head 210 further includes the non-magnetic conductive structure 310 disposed between the main pole 220 and the leading shield 206. The non-magnetic conductive structure 310 is insulated from the main pole 220 and the leading shield 206 by the dielectric material 254.

Figure 5B:
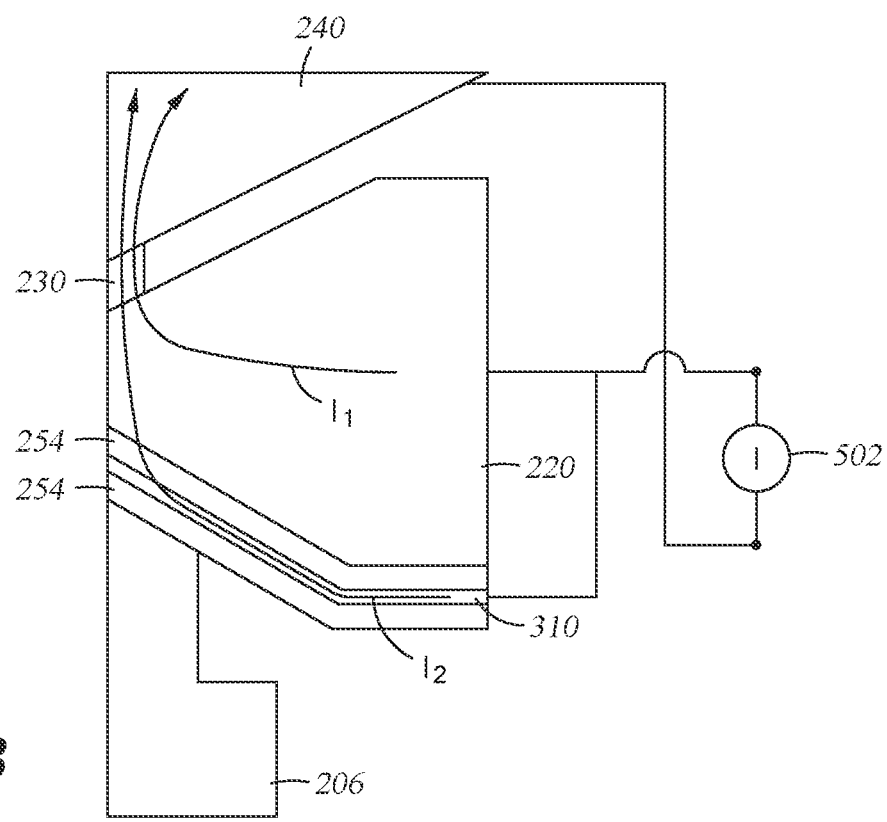

As shown in FIG. 5B, the current source 502 is connected to the main pole 220, the trailing shield 240, and the non-magnetic conductive structure 310. In addition to the current $I_1$, a second current $I_2$ flows from the non-magnetic conductive structure 310 to the trailing shield 240 through the main pole 220 and the STO 230.

Figure 5C:
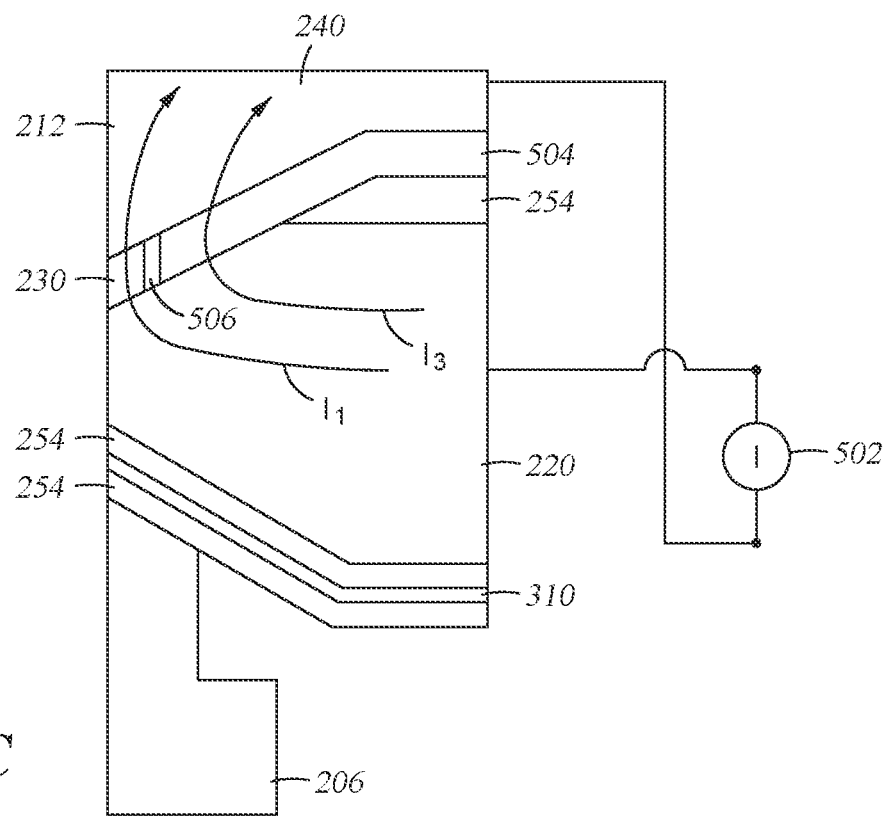

As shown in FIG. 5C, a non-magnetic conductive layer 504 is disposed between the main pole 220 and the trailing shield 240 at a location recessed from the MFS 212. The non-magnetic conductive layer 504 may be fabricated from the same material as the non-magnetic conductive structure 310. In one embodiment, a dielectric layer 506 is disposed between the STO 230 and the non-magnetic conductive layer 504. The dielectric layer 506 may be fabricated from the same material as the dielectric material 254. The dielectric material 254 is disposed between a portion of the non-magnetic conductive layer 504 and a portion of the main pole 220. The current source 502 is connected to the main pole 220 and the trailing shield 240. In addition to the current $I_1$, a second current $I_3$ flows from the main pole 220 to the trailing shield 240 through the non-magnetic conductive layer 504. As current $I_3$ flows through the non-magnetic conductive layer 504 that is disposed between two magnetic layers, i.e., between the main pole 220 and the trailing shield 240, write-ability of the write head 210 is improved. In one embodiment, the STO 230 and the dielectric layer 506 are not present, and the non-magnetic conductive layer 504 extends to the MFS 212.

Figure 5D:
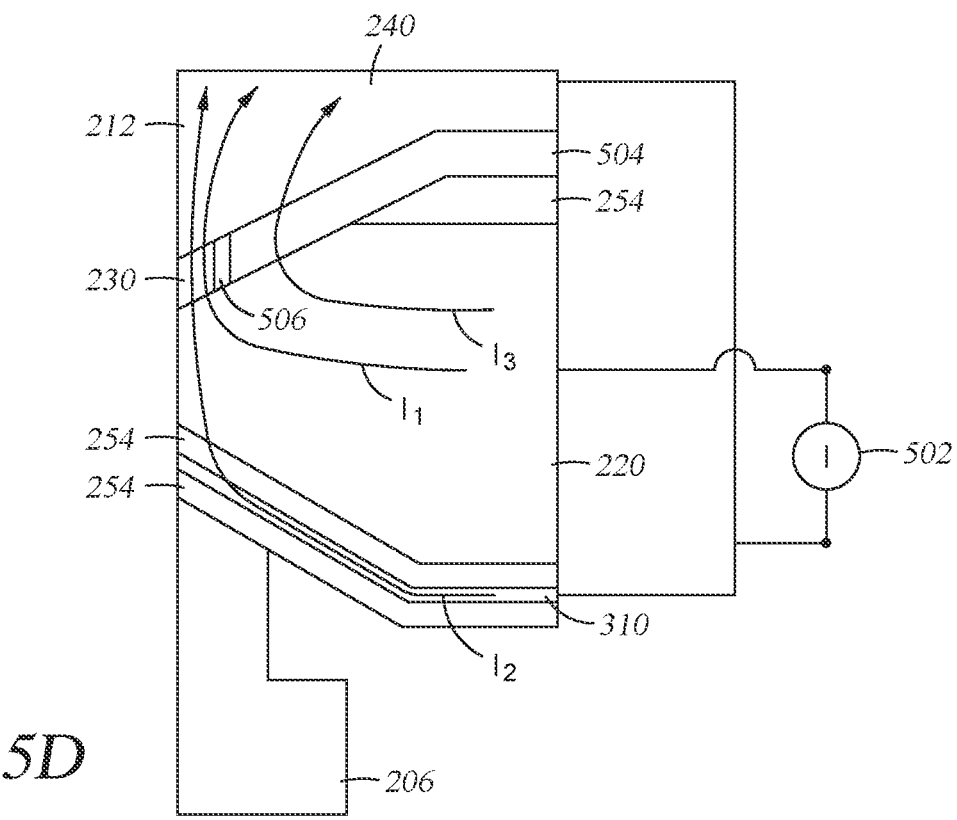

As shown in FIG. 5D, the current source 502 is connected to the main pole 220, the trailing shield 240, and the non-magnetic conductive structure 310. Current $I_1$ flows from the main pole 220 to the trailing shield 240 through the STO 230, current $I_2$ flows from the non-magnetic conductive structure 310 to the trailing shield 240 through the main pole 220 and the STO 230, and current $I_3$ flows from the main pole 220 to the leading shield 206 through the non-magnetic conductive layer 504. In one embodiment, the FGL of the STO 230 is located proximate to the main pole 220. In another embodiment, the FGL of the STO 230 is located proximate to the trailing shield 240. The operations of the current source 502 are controlled by the control unit 129 (FIG. 1). With the various current flow patterns shown in FIGS. 5A-5D, different modes of oscillation by the STO 230 can be achieved.

FIGS. 6A-6C are cross sectional side views of the write head 210 of FIG. 4A according to embodiments. The dielectric material 254 between the trailing shield 240 and the main pole 220 is omitted in FIG. 6A for better illustration. As shown in FIG. 6A, the write head 210 includes a current source 602 connected to the main pole 220 and the trailing shield 240. A current $I_4$ generated from the current source 602 flows from the trailing shield 240 to the main pole 220 through the STO 230. The FGL of the STO 230 is located proximate the trailing shield 240. The write head 210 further includes the non-magnetic conductive structure 310 disposed between the main pole 220 and the leading shield 206. The non-magnetic conductive structure 310 is in contact with the main pole 220 and insulated from the leading shield 206 by the dielectric material 254.

As shown in FIG. 6B, the write head 210 includes the non-magnetic conductive layer 504 and the dielectric material 254 disposed between the portion of the non-magnetic conductive layer 504 and the portion of the main pole 220. The write head 210 further includes a dielectric layer 606 disposed between the STO 230 and the non-magnetic conductive layer 504, and between the trailing shield 240 and the non-magnetic conductive layer 504. In addition to the first current source 602 connected to the main pole 220 and the trailing shield 240, the write head 210 further includes a second current source 604 connected to the main pole 220 and the non-magnetic conductive layer 504. The current $I_4$ generated from the current source 602 flows from the trailing shield 240 to the main pole 220 through the STO 230. The FGL of the STO 230 is located proximate the trailing shield 240. A current $I_5$ generated from the current source 604 flows from the non-magnetic conductive layer 504 to the main pole 220. As the current $I_5$ flows through the non-magnetic conductive layer 504 that is disposed between two magnetic layers, i.e., between the main pole 220 and the trailing shield 240, write-ability of the write head 210 is improved. In one embodiment, the STO 230 and the dielectric layer 606 are not present, and the non-magnetic conductive layer 504 extends to the MFS 212.

As shown in FIG. 6C, the current source 602 is connected to the main pole 220, the trailing shield 240, and the non-magnetic conductive layer 504. A current $I_6$ generated from the current source 602 flows from the main pole 220 to the trailing shield 240 through the STO 230. The FGL of the STO 230 is located proximate the main pole 220. A current $I_7$ generated from the current source 602 flows from the main pole 220 to the non-magnetic conductive layer 504. As the current $I_7$ flows through the non-magnetic conductive layer 504 that is disposed between two magnetic layers, i.e., between the main pole 220 and the trailing shield 240, write-ability of the write head 210 is improved. In one embodiment, the STO 230 and the dielectric layer 606 are not present, and the non-magnetic conductive layer 504 extends to the MFS 212. The operations of the current sources 602, 604 are controlled by the control unit 129 (FIG. 1). With the various current flow patterns shown in FIGS. 6A-6C, different modes of oscillation by the STO 230 can be achieved.

Figure 7A:
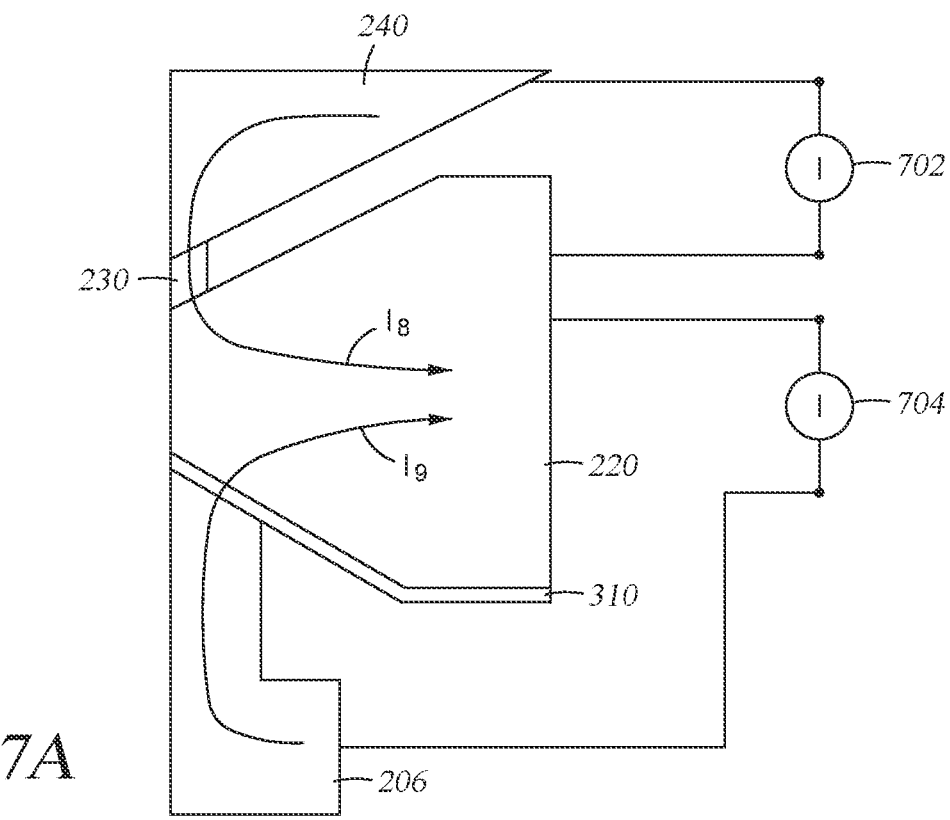
FIGS. 7A-7F are cross sectional side views of the write head of FIG. 4B according to embodiments.

FIGS. 7A-7F are cross sectional side views of the write head 210 of FIG. 4B according to embodiments. The dielectric material 254 between the trailing shield 240 and the main pole 220 is omitted in FIGS. 7A and 7D for better illustration. As shown in FIG. 7A, the write head 210 includes a first current source 702 connected to the main pole 220 and the trailing shield 240. A current $I_8$ generated from the current source 602 flows from the trailing shield 240 to the main pole 220 through the STO 230. The FGL of the STO 230 is located proximate the trailing shield 240. In one embodiment, the STO 230 includes one magnetic layer, such as the magnetic layer 304 (FIG. 3A), while the magnetic layer 302 (FIG. 3A) is not present. The write head 210 further includes a second current source 704 connected to the main pole 220 and the leading shield 206. A current $I_9$ generated from the current source 704 flows from the leading shield 206 to the main pole 220 through the non-magnetic conductive structure 310. As the current $I_9$ flows through the non-magnetic conductive structure 310 that is disposed between two magnetic layers, i.e., between the main pole 220 and the leading shield 206, write-ability of the write head 210 is improved.

Figure 7B:
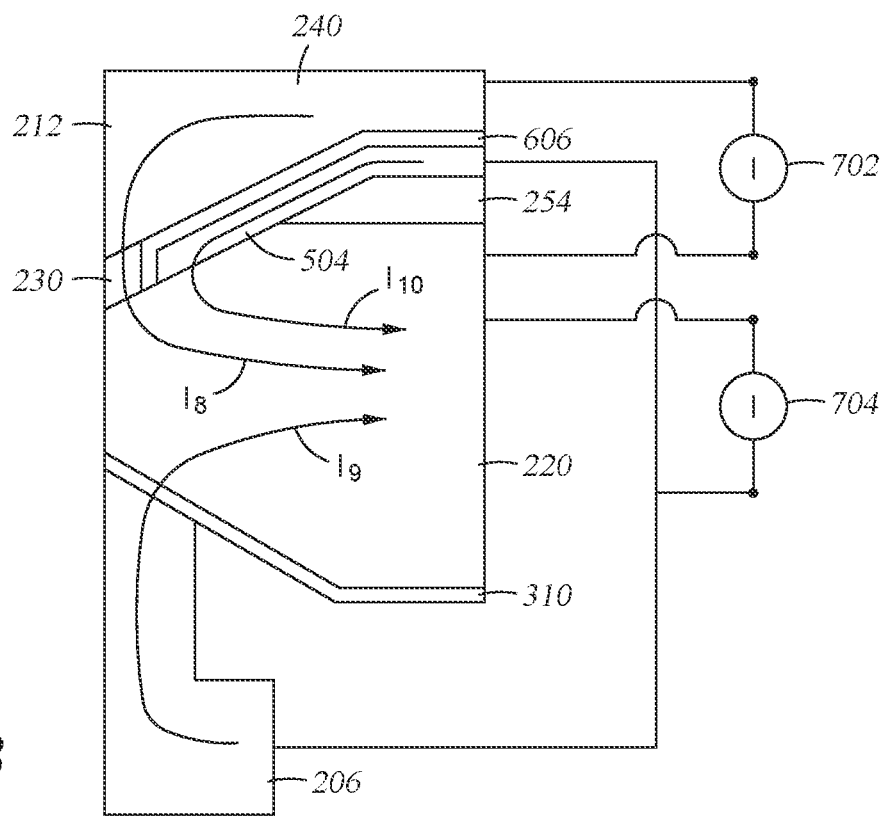

As shown in FIG. 7B, the write head 210 includes the non-magnetic conductive layer 504, the dielectric layer 606, and the dielectric material 254 disposed between the portion of the non-magnetic conductive layer 504 and the portion of the main pole 220. The second current source 704 is connected to the main pole 220, the leading shield 206, and the non-magnetic conductive layer 504. In addition to the currents $I_8$ and $I_9$, a current $I_{10}$ generated from the second current source 704 flows from the non-magnetic conductive layer 504 to the main pole 220. As the current $I_{10}$ flows through the non-magnetic conductive layer 504 that is disposed between two magnetic layers, i.e., between the main pole 220 and the trailing shield 240, write-ability of the write head 210 is improved. In one embodiment, the STO 230 and the dielectric layer 606 are not present, and the non-magnetic conductive layer 504 extends to the MFS 212.

Figure 7C:
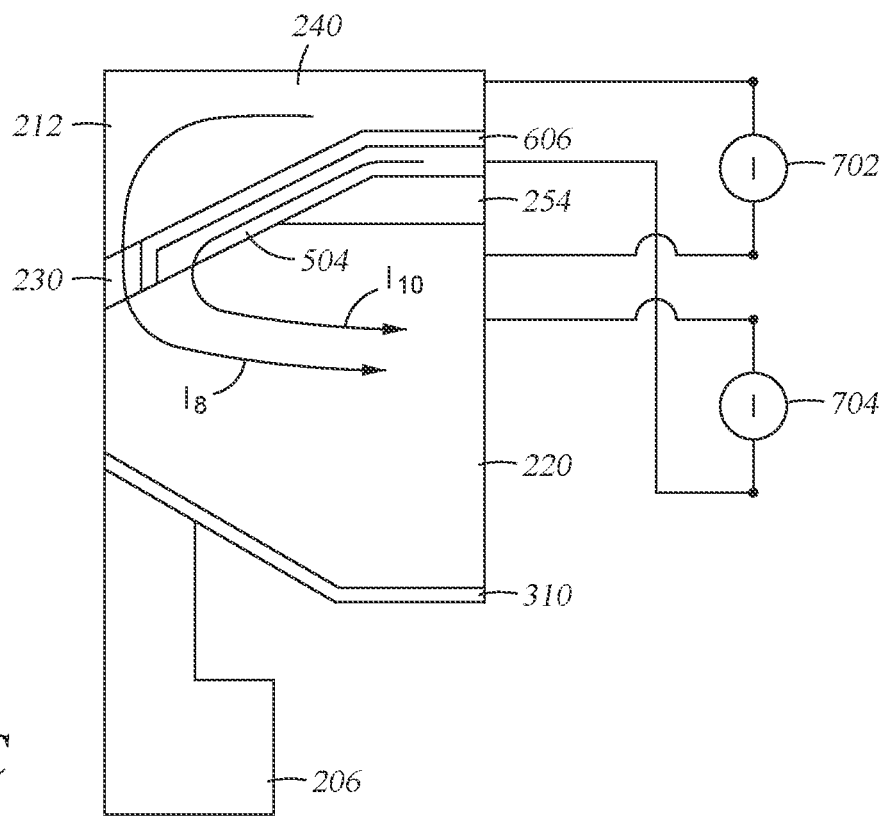

As shown in FIG. 7C, the current source 702 is connected to the main pole 220 and the trailing shield 240. The current $I_8$ generated from the current source 702 flows from the trailing shield 240 to the main pole 220 through the STO 230. The FGL of the STO 230 is located proximate the trailing shield 240. The current source 704 is connected to the non-magnetic conductive layer 504 and the main pole 220. The current $I_{10}$ generated from the current source 704 flows from the non-magnetic conductive layer 504 to the main pole 220. As the current $I_{10}$ flows through the non-magnetic conductive layer 504 that is disposed between two magnetic layers, i.e., between the main pole 220 and the trailing shield 240, write-ability of the write head 210 is improved. In one embodiment, the STO 230 and the dielectric layer 606 are not present, and the non-magnetic conductive layer 504 extends to the MFS 212.

Figure 7D:
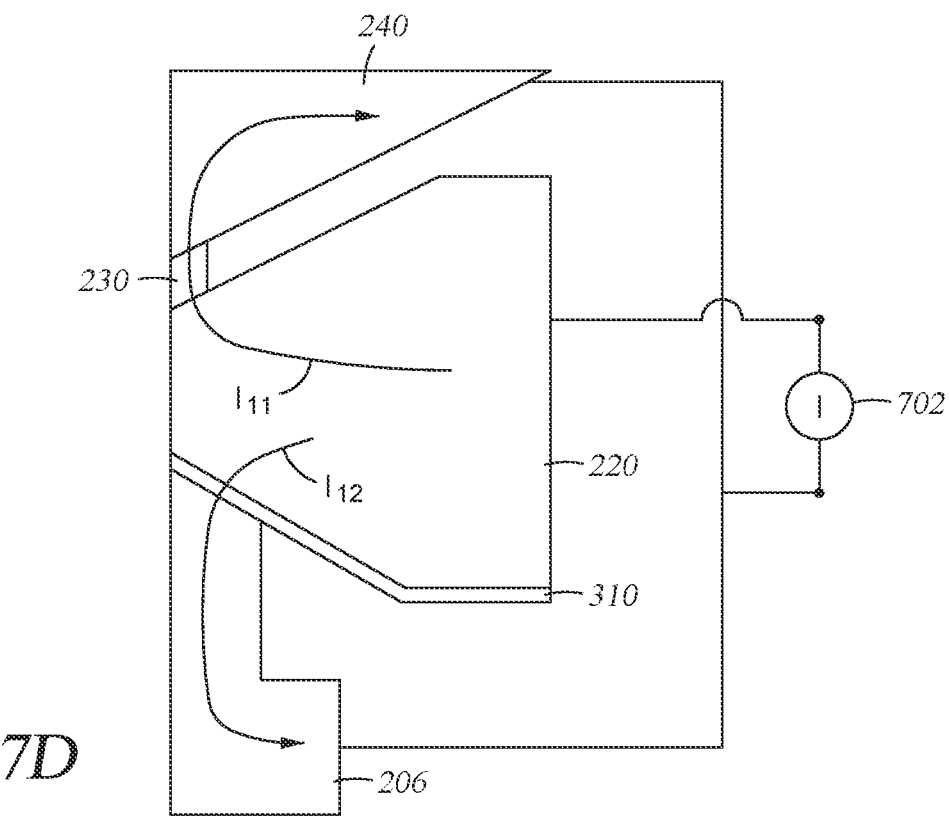

As shown in FIG. 7D, the current source 702 is connected to the main pole 220, the trailing shield 240, and the leading shield 206. A current $I_{11}$ generated from the current source 702 flows from the main pole 220 to the trailing shield 240 through the STO 230. The FGL of the STO 230 is located proximate the trailing shield 240. A current $I_{12}$ generated from the current source 702 flows from the main pole 220 to the leading shield 206 through the non-magnetic conductive structure 310. As the current $I_{12}$ flows through the non-magnetic conductive structure 310 that is disposed between two magnetic layers, i.e., between the main pole 220 and the leading shield 206, write-ability of the write head 210 is improved.

Figure 7E:
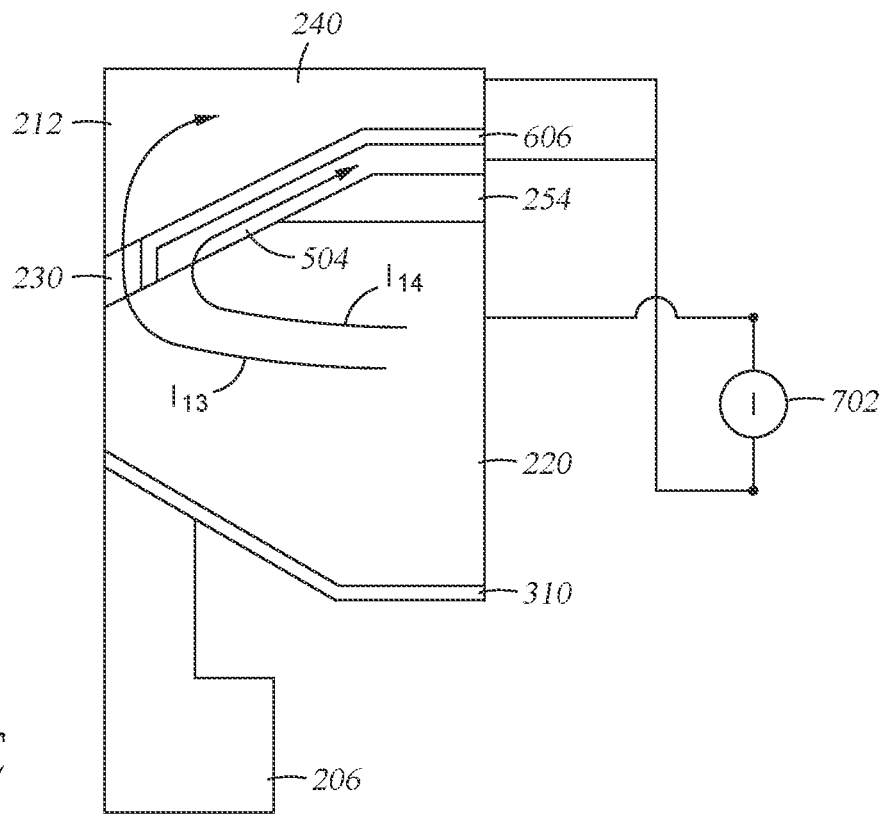

As shown in FIG. 7E, the current source 702 is connected to the main pole 220, the trailing shield 240, and the non-magnetic conductive layer 504. A current $I_{13}$ generated from the current source 702 flows from the main pole 220 to the trailing shield 240 through the STO 230. In one embodiment, the FGL of the STO 230 is located proximate the trailing shield 240. In another embodiment, the FGL of the STO 230 is located proximate the main pole 220. A current $I_{14}$ generated from the current source 702 flows from the main pole 220 to the non-magnetic conductive layer 504. As the current $I_{14}$ flows through the non-magnetic conductive layer 504 that is disposed between two magnetic layers, i.e., between the main pole 220 and the trailing shield 240, write-ability of the write head 210 is improved. In one embodiment, the STO 230 and the dielectric layer 606 are not present, and the non-magnetic conductive layer 504 extends to the MFS 212.

Figure 7F:
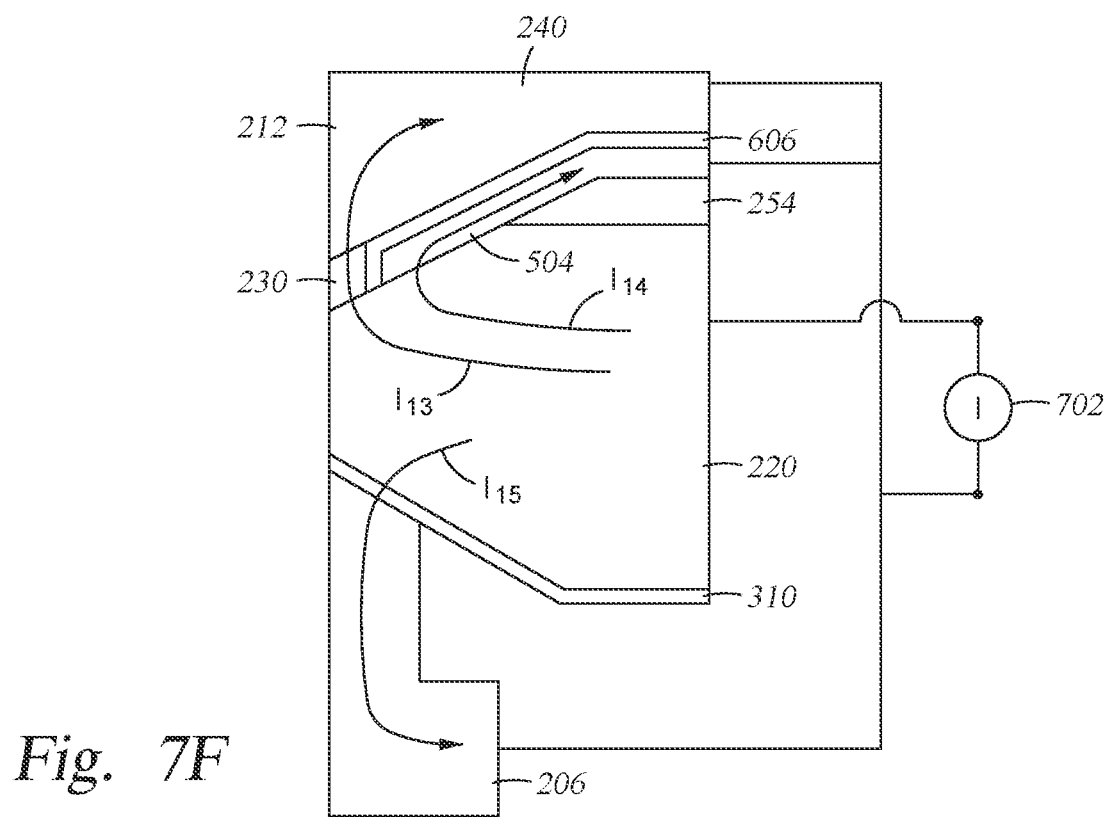

As shown in FIG. 7F, the current source 702 is connected to the main pole 220, the trailing shield 240, the leading shield 206, and the non-magnetic conductive layer 504. In addition to the currents $I_{13}$ and $I_{14}$, a current $I_{15}$ generated from the current source 702 flows from the main pole 220 to the leading shield 206 through the non-magnetic conductive structure 310. As the current $I_{15}$ flows through the non-magnetic conductive structure 310 that is disposed between two magnetic layers, i.e., between the main pole 220 and the leading shield 206, write-ability of the write head 210 is improved. In one embodiment, the STO 230 and the dielectric layer 606 are not present, and the non-magnetic conductive layer 504 extends to the MFS 212.

The data storage device including the MAMR write head having a non-magnetic conductive structure provides additional paths for electrical currents to flow to the STO. The non-magnetic conductive structure enables higher current density to the STO without creating hot spots at the MFS. Maximum current efficiency and uniformity can be achieved with the non-magnetic conductive structure.

While the foregoing is directed to embodiments of the present disclosure, other and further embodiments of the disclosure may be devised without departing from the basic scope thereof, and the scope thereof is determined by the claims that follow.

The invention claimed is:
1. A magnetic recording head, comprising:
 a main pole;
 a spin torque oscillator in contact with the main pole, the spin torque oscillator having a first width in a cross-track direction; and
 a non-magnetic conductive structure in contact with the main pole and the spin torque oscillator at a media facing surface, wherein the first width of the spin torque oscillator is greater than a collective width in the cross-track direction of the main pole and the non-magnetic conductive structure where the main pole and the non-magnetic conductive structure contact the spin torque oscillator.

2. The magnetic recording head of claim 1, wherein the non-magnetic conductive structure comprises NiTa, Cr, Cu, Rh, NiTa/Ru, Cr/Cu, or Cr/Rh.

3. The magnetic recording head of claim 1, wherein the main pole includes a first surface at the media facing surface, a second surface adjacent to the first surface, a third surface connected to the second surface, and a fourth surface opposite the third surface, wherein the second surface of the main pole is in contact with the spin torque oscillator.

4. The magnetic recording head of claim 3, wherein the non-magnetic conductive structure includes a first portion and second portion, wherein the first portion is in contact with the fourth surface of the main pole and the second portion is in contact with the third surface of the main pole.

5. The magnetic recording head of claim 4, wherein the first portion of the non-magnetic conductive structure includes a first surface and a second surface opposite the first surface, wherein the first surface of the first portion of the non-magnetic conductive structure is in contact with the spin torque oscillator, and the second portion of the non-magnetic conductive structure includes a first surface and a second surface opposite the first surface, wherein the first surface of the second portion of the non-magnetic conductive structure is in contact with the spin torque oscillator.

6. The magnetic recording head of claim 5, wherein the first surface of the first portion of the non-magnetic conductive structure, the first surface of the second portion of the non-magnetic conductive structure, and the second surface of the main pole are co-planar, and the second surface of the first portion of the non-magnetic conductive structure and the second surface of the second portion of the non-magnetic conductive structure are co-planar.

7. The magnetic recording head of claim 1, wherein the spin torque oscillator comprises:
a first magnetic layer;
a second magnetic layer;
an interlayer disposed between the first magnetic layer and the second magnetic layer; and
a cap layer.

8. The magnetic recording head of claim 7, wherein the first magnetic layer is disposed adjacent the main pole.

9. The magnetic recording head of claim 7, wherein the first magnetic layer is a spin polarization layer.

10. The magnetic recording head of claim 9, wherein the spin polarization layer comprises CoNi, CoPt, CoCrPt, CoPd, FePt, CoFePd, TbFeCo, CoMnGe, or combinations thereof.

11. The magnetic recording head of claim 7, wherein the second magnetic layer is a field generating layer.

12. The magnetic recording head of claim 11, wherein the field generation layer comprises a CoFe layer, or Co and Fe laminations.

13. The magnetic recording head of claim 7, wherein the interlayer comprises Au, Ag, Cu, or AgSn.

14. The magnetic recording head of claim 7, wherein the cap layer is an electrically conductive layer.

15. The magnetic recording head of claim 14, wherein the electrically conductive layer comprises a Ru/Ta/Ru multi-layer stack.

16. The magnetic recording head of claim 1, wherein the spin torque oscillator further has a second width at the media facing surface that is greater than a width of the main pole at the media facing surface.

17. The magnetic recording head of claim 1, further comprising a trailing shield in contact with the spin torque oscillator.

18. The magnetic recording head of claim 1, further comprising a dielectric layer disposed in contact with the non-magnetic conductive structure, the dielectric layer contacting the spin torque oscillator.

19. A magnetic media device comprising:
a magnetic recording head, comprising:
a main pole;
a spin torque oscillator in contact with the main pole, the spin torque oscillator having a first width in a cross-track direction; and
a non-magnetic conductive structure in contact with the main pole and the spin torque oscillator at a media facing surface, wherein the first width of the spin torque oscillator is greater than a collective width in the cross-track direction of the main pole and the non-magnetic conductive structure where the main pole and the non-magnetic conductive structure contact the spin torque oscillator.

20. The magnetic media device of claim 19, further comprising a dielectric layer disposed in contact with the non-magnetic conductive structure, the dielectric layer contacting the spin torque oscillator.

* * * * *